(12) United States Patent
Tanaka et al.

(10) Patent No.: US 6,683,831 B2
(45) Date of Patent: Jan. 27, 2004

(54) OBJECTIVE LENS ACTUATOR

(75) Inventors: Toshiyuki Tanaka, Moriguchi (JP);
Seiichi Nagatome, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 280 days.

(21) Appl. No.: 10/033,117

(22) Filed: Oct. 25, 2001

(65) Prior Publication Data

US 2002/0085459 A1 Jul. 4, 2002

(30) Foreign Application Priority Data

Oct. 26, 2000 (JP) .......................................... 2000-327711

(51) Int. Cl.[7] ................................................. G11B 7/00
(52) U.S. Cl. ................................ 369/44.14; 369/44.15; 359/814
(58) Field of Search ........................... 369/44.11, 44.14, 369/44.15, 44.16, 44.27, 112.01, 112.23; 359/813, 814, 823, 824

(56) References Cited

U.S. PATENT DOCUMENTS

| 4,615,585 | A | | 10/1986 | Van Sluys et al. |
| 4,752,117 | A | * | 6/1988 | Ichikawa et al. ............ 359/814 |
| 5,648,947 | A | * | 7/1997 | Hamaguchi et al. ...... 369/44.28 |
| 5,687,033 | A | | 11/1997 | Futagawa et al. |
| 5,719,834 | A | | 2/1998 | Futagawa et al. |
| 5,886,978 | A | * | 3/1999 | Matsui ......................... 369/244 |

* cited by examiner

*Primary Examiner*—Muhammad Edun
(74) *Attorney, Agent, or Firm*—Edwards & Angell, LLP; David G. Conlin; George H. Hartnell, III

(57) ABSTRACT

In an objective lens actuator, when an action force generation force including a focus coil and a magnetic circuit generates an action force for displacing an objective lens holder in a focus direction of an optical disk, a leaf spring supports the magnetic circuit with respect to an actuator base, in such a manner that the magnetic circuit can be rotated about an arbitrary point in the leaf spring, by a reaction force of the action force. At the same time, the equation $a = I/Mh$ is satisfied, where M is a mass of the magnetic circuit, I is a moment of inertia of the magnetic circuit about a center of gravity, a is a distance between the center of gravity of the magnetic circuit and a line of action in a direction of the action force, and h is a distance between a center of rotation in the leaf spring and the center of gravity of the magnetic circuit. As a result, even if the reaction force of the action force acting on the objective lens holder is generated, stable focus servo can be performed, and the actuator can be downsized with a simple structure.

10 Claims, 12 Drawing Sheets

F I G. 2
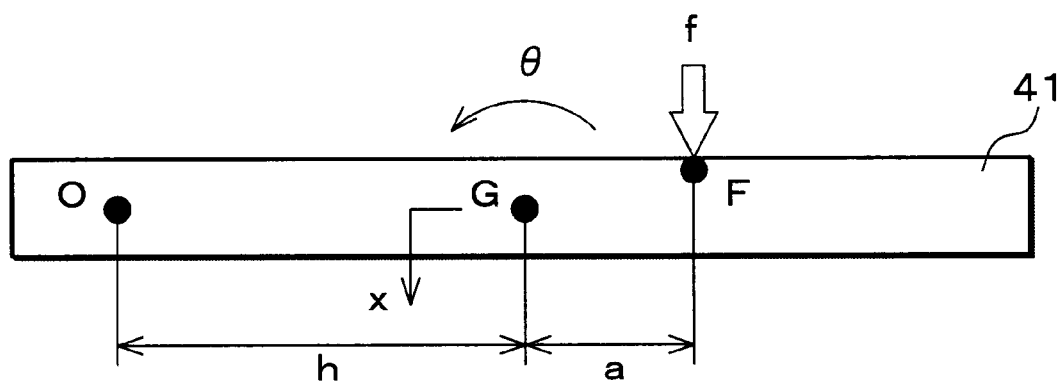

F I G. 8
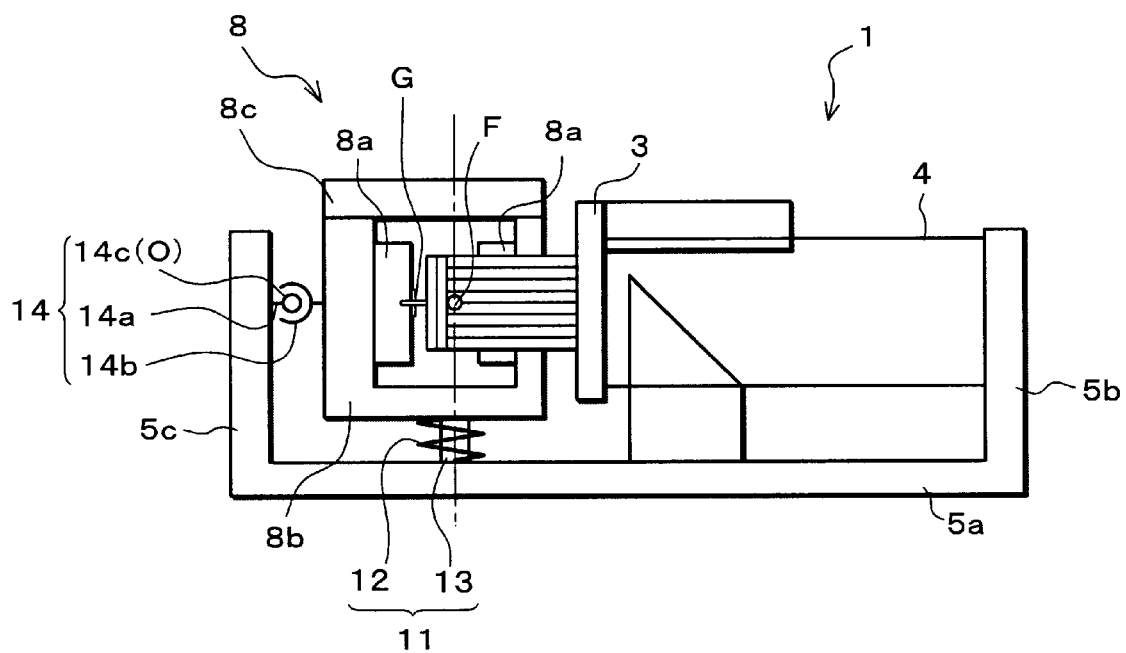

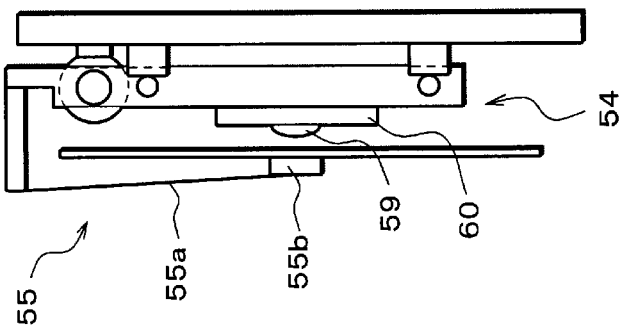
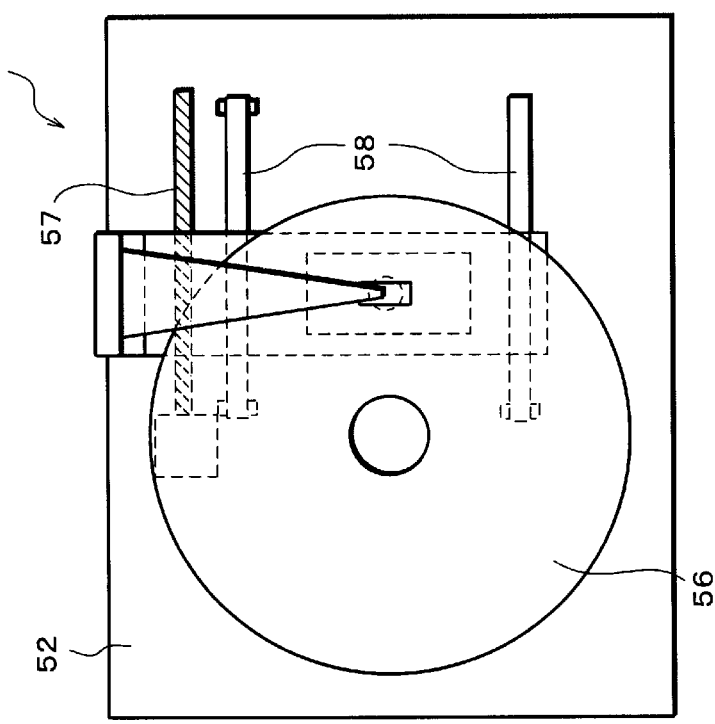
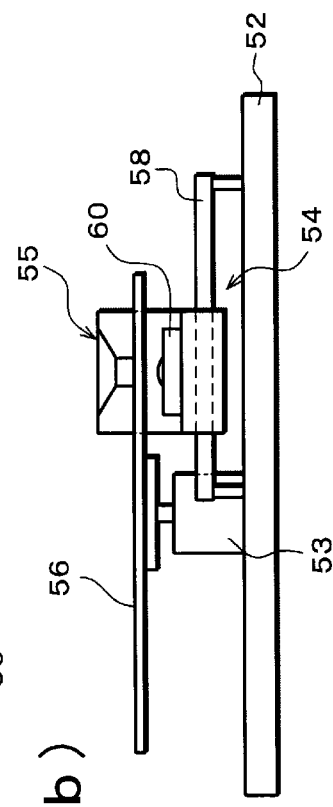

F I G. 1 0 (a)
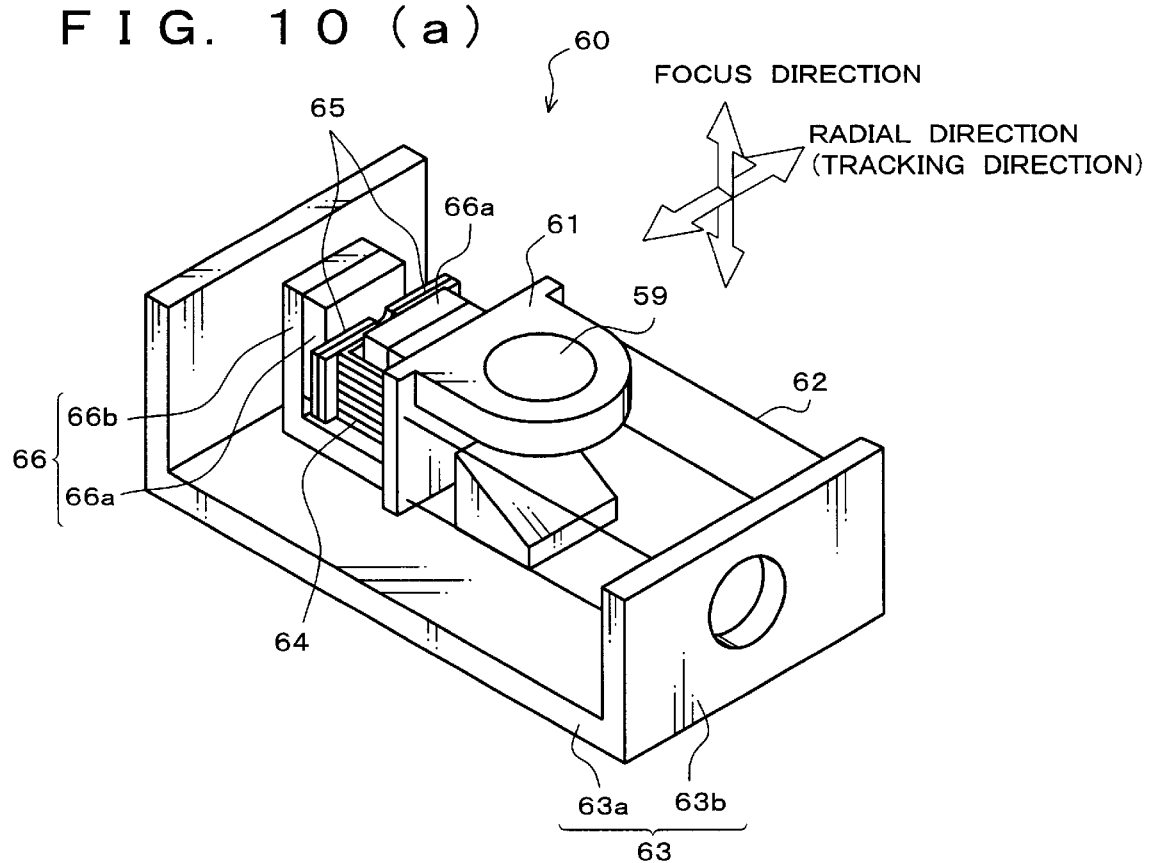
F I G. 1 0 (b)
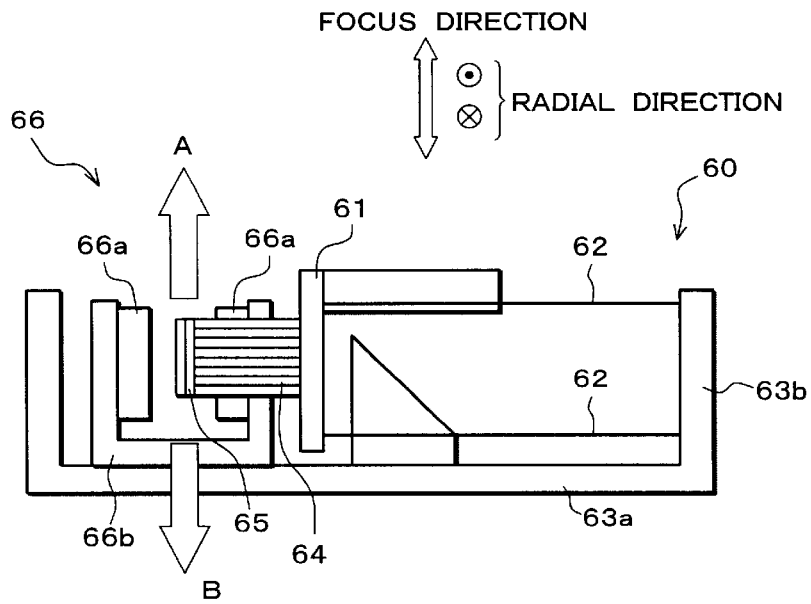

OBJECTIVE LENS ACTUATOR

FIELD OF THE INVENTION

The present invention relates to an objective lens actuator used in an optical disk device for recording and reproducing information on/from an optical disk such as a magneto-optical disk, for displacing an objective lens in a focus direction and in a track direction so as to perform focus servo and tracking servo to the optical disk.

BACKGROUND OF THE INVENTION

FIGS. 9(a) through 9(c) show a schematic structure of a magneto-optical disk device 51, one of optical disk devices. The magneto-optical disk device 51 is made up of a mechanical chassis 52, a spindle motor 53 fixed to the mechanical chassis 52, an optical pick-up 54 provided with an objective lens 59, a magnetic head unit 55 fixed to the optical pick-up 54, a feeder 57 and guide axes 58 for moving the optical pick-up 54 in a direction of a radius of a magneto-optical disk 56 chucked by the spindle motor 53.

The optical pick-up 54 focuses a light beam emitted from a laser light source (not shown) onto the magneto-optical disk 56 by the objective lens 59. The objective lens 59 is driven in a focus direction and in a tracking direction by an actuator 60 which will be mentioned later [see FIGS. 10(a) and 10(b)], so as to follow the surface vibration of a disk and the decentering of a track.

The magnetic head unit 55 is made up of a suspension 55a and a slider section 55b. The suspension 55a presses the slider section 55b with an appropriate force by elastic deformation, so as to prevent the slider section 55b from detaching from the magneto-optical disk 56 when the surface vibration of the disk occurs.

FIGS. 10(a) and 10(b) show a detailed structure of the objective lens actuator 60. The objective lens 59 is held by an objective lens holder 61. The objective lens holder 61 is fixed to an actuator base 63 via four support wires 62 which are located in parallel to one another. More specifically, the objective lens holder 61 is fixed via the support wires 62 to a rising section 63b of the actuator base 63, which is formed by raising one end of a horizontal section 63a of the actuator base 63 in a lengthwise direction, vertically with respect to the horizontal section 63a.

On a side of the objective lens holder 61 opposite to a side facing the rising section 63b, a focus coil 64 and a tracking coil 65 are fixed. A magnetic flux is generated in a cavity in a magnetic circuit 66 made up of permanent magnets 66a and a yoke 66b, and the magnetic flux and a current flowing the foregoing coils react one another, permitting the objective lens 59 to be displaced freely in the focus direction and the tracking direction.

When a light beam is spot-emitted on the magneto-optical disk 56 by the objective lens 59 of the optical pick-up 54, as shown in FIG. 11, the temperature of a section subjected to the spot emission in a recording medium 56b formed on a disk substrate 56a of the magneto-optical disk 56 is increased, and the coercive force of a magnetic substance of the recording medium 56b in the section is decreased. Here, if a magnetic field is given to the section subjected to the spot emission by a magnetic head 55c of the slider section 55b, the section is easily magnetized, and information is recorded on the magneto-optical disk 56.

Incidentally, in the magneto-optical disk device 51 structured as mentioned above, when trying to displace the objective lens holder 61 in the focus direction [in a direction of an arrow A in FIG. 10(b)] so as to perform focus servo, a reaction force [a force acting in a direction of an arrow B in FIG. 10(b)] is applied to the magnetic circuit 66 and the actuator base 63 which directly supports the magnetic circuit 66, vibrating the whole optical pick-up 54. The vibration is transmitted to the magneto-optical disk 56 via the guide axes 58 and the spindle motor 53. As a result, the magneto-optical disk 56 is vibrated, which makes it difficult to perform stable focus servo.

Thus, for example, Japanese Unexamined Patent Publication No. 7-105550 (Tokukaihei 7-105550, published on Apr. 21, 1995) (U.S. Pat. No. 5,719,834) discloses a structure for elastically supporting the magnetic circuit 66 with flexibility in a focus direction, using two parallel leaf springs 67, as shown in FIGS. 12(a) and 12(b). More specifically, the magnetic circuit 66 is fixed, via the parallel leaf springs 67 located parallel to the horizontal section 63a of the actuator base 63, to a rising section 63c of the actuator base 63, which is formed by raising the other end of the horizontal section 63a in a lengthwise direction (on a side opposite to the rising section 63b in the lengthwise direction), vertically with respect to the horizontal section 63a. Therefore, in this structure, a slight vanity is formed between the magnetic circuit 66 and the horizontal section 63a.

In this structure, when the objective lens holder 61 is moved in the focus direction, the magnetic circuit 66 is moved in a direction opposite to the moving direction of the objective lens holder 61, by a reaction force applied to the magnetic circuit 66. At this time, the parallel leaf springs 67 supporting the magnetic circuit 66 flex, and eventually, the vibration of the magnetic circuit 66 caused by the reaction force is absorbed by the flexure of the parallel leaf springs 67. Therefore, this structure can prevent the actuator base 63 and the optical pick-up 54 from being vibrated by the displacement of the magnetic circuit 66 in accordance with the displacement of the objective lens holder 61 in the focus direction, achieving stable focus servo.

However, in the structure disclosed in the foregoing publication which supports the magnetic circuit 66 using the parallel leaf springs 67, there is a problem that it is difficult to downsize the actuator 60.

That is, in the structure disclosed in the foregoing publication, since the parallel leaf springs 67 are provided between the magnetic circuit 66 and the rising section 63c, a length a of the horizontal section 63a in the lengthwise direction, is increased compared with the case where the parallel leaf springs 67 are not provided, resulting in an increase in the size of the actuator 60.

Here, it can be considered, for example, to adopt a technique for downsizing the actuator 60 by decreasing the length of the parallel leaf springs 67 in the lengthwise direction without changing a spring constant, using a material with a low Young's modulus to form the parallel leaf springs 67. In this case, however, the parallel leaf springs 67 flex more, compared with the case where longer parallel leaf springs 67 having the identical spring constant are formed using a material with a higher Young's modulus, and the parallel leaf springs 67 are likely to be subjected to plastic deformation. This structure causes a problem in the displacement of the magnetic circuit 66 in accordance with the displacement of the objective lens holder 61 in the focus direction.

Incidentally, in order to prevent plastic deformation, it can also be considered, for example, to provide a stopper for limiting the displacement of the parallel leaf springs 67. In this case, however, if the length of the parallel leaf springs 67 is short, the positioning accuracy of the stopper should be enhanced, increasing design load.

SUMMARY OF THE INVENTION

The present invention is made to solve the foregoing problems, and its object is to provide an objective lens actuator which is capable of performing stable focus servo even if a reaction force of a force acting on an objective lens holder is generated, and being downsized with a simple structure.

To achieve the foregoing object, an objective lens actuator in accordance with the present invention is structured so as to include:

- an objective lens holding element for holding an objective lens which focuses a light beam onto an optical disk;
- an action force generation source for generating an action force for displacing the objective lens holding element in a focus direction of the optical disk, by using a coil and a magnetic circuit;
- a support member for supporting either the coil or the magnetic circuit as a supported element, with respect to an actuator base,
- wherein, when the action force generation source generates the action force, the support member supports the supported element in such a manner that the supported element can be rotated about an arbitrary point of the support member by a reaction force of the action force; and
- an equation a=I/Mh holds,
- where M is a mass of the supported element, I is a moment of inertia of the supported element about a center of gravity, a is a distance between the center of gravity of the supported element and a line of action in a direction of the action force, and h is a distance between a center of rotation in the support member and the center of gravity of the supported element.

According to the foregoing structure, when the objective lens holder is displaced in the focus direction by the action force generated by the action force generation source, among the coil and the magnetic circuit in the action force generation source, either one of them which is supported by the support member comes to rotate about the arbitrary point of the support member.

Here, since the equation a=I/Mh is satisfied, even if the action force is an active force such as a sinusoidal wave excitation force, the support member deforms in the same way as in the case where a static force is applied, and thus the supported element rotates statically. With this structure, the reaction force can be surely absorbed. That is, even if the supported element is excited by the reaction force, the excitation is surely retrained by the rotation of the supported element supported by the support member. As a result, the structure eliminates the vibration of the actuator base by the reaction force transmitted via the support member, and the vibration of the optical disk via the actuator base. Therefore, according to the foregoing structure, it becomes possible to eliminate the vibration of the optical disk caused by the reaction force, and to perform stable focus servo.

In the foregoing structure, since the reaction force is absorbed by the rotation of the supported element, assuming that the support member is, for example, a leaf spring, even when the length of the support member is shortened compared with that used in the conventional structure having parallel leaf springs, while the spring constant, the geometrical moment of inertia, and the Young's modulus of the leaf spring remain the same as those of the leaf spring used in the conventional structure, the effect of reaction force absorption, that is, the effect of vibration absorption can be surely obtained. That is, according to the foregoing structure, the length of the support member can be shortened without deteriorating the vibration absorption effect. As a result, the actuator can be surely downsized compared with the conventional parallel leaf springs structure.

Besides, since the length of the support member can be shortened even though it is not made of a material having a low Young's modulus, there is no need to worry about plastic deformation of the support member. Therefore, there is no need to additionally provide a structure for preventing the plastic deformation, and thus the support member can be shortened with a simple structure.

For a fuller understanding of the nature and advantages of the invention, reference should be made to the ensuing detailed description taken in conjunction with the accompanying drawings.

BRIEF DESCRIPTION OF THE DRAWINGS

FIG. 2 is an explanatory view explaining a principle underlying the objective lens actuator.

FIG. 8 is a side view showing still another example of a structure of the objective lens actuator.

FIG. 9(a) is a plan view showing a schematic structure of a magneto-optical disk device, FIG. 9(b) is a front view of the magneto-optical disk device, and FIG. 9(c) is a side view of the magneto-optical disk device.

FIG. 10(a) is a perspective view showing a schematic structure of a conventional objective lens actuator installed in the magneto-optical disk device, and FIG. 10(b) is a side view of the objective lens actuator.

DESCRIPTION OF THE PREFERRED EMBODIMENTS

FIRST EMBODIMENT

Figure 1:
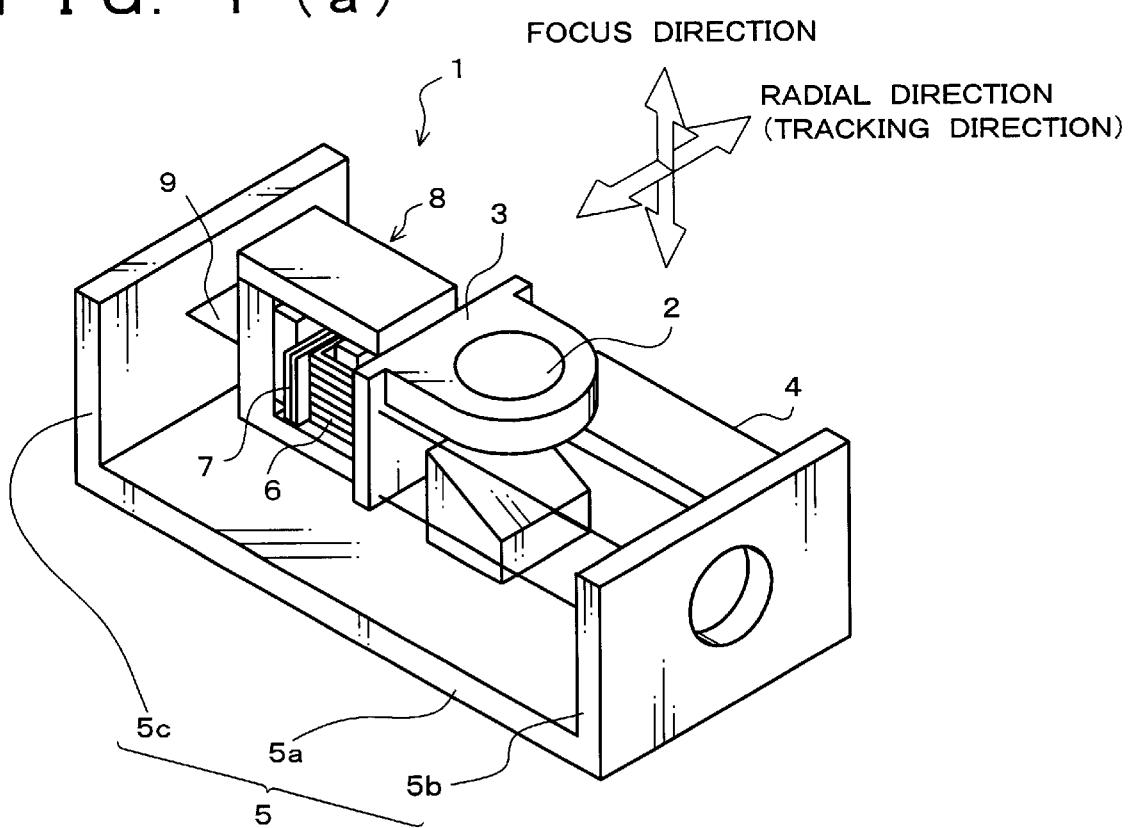
FIG. 1(a) is a perspective view showing a schematic structure of an objective lens actuator in accordance with one embodiment of the present invention.
FIG. 1(b) is a side view of the objective lens actuator.
Figure 1:
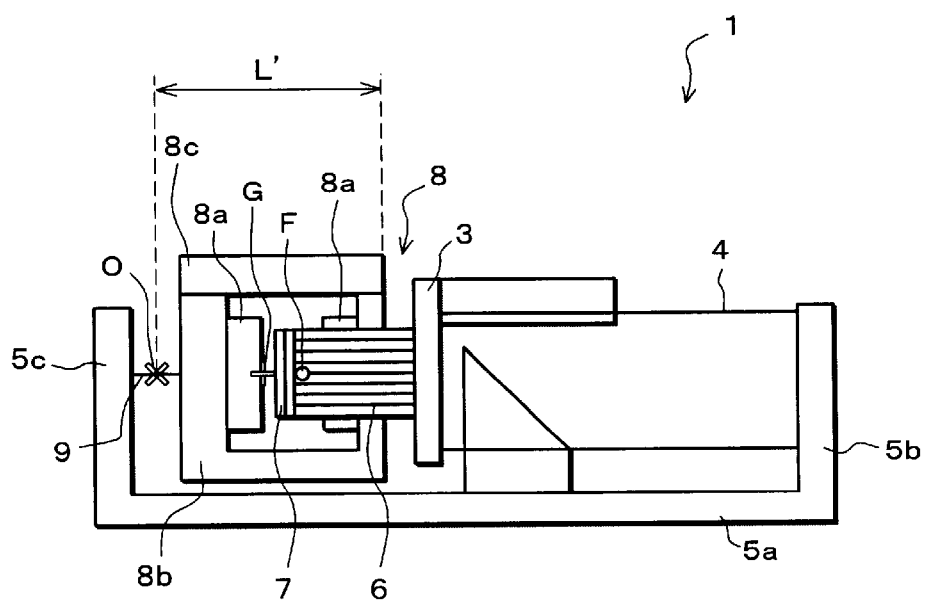

Referring to the drawings, the following description will describe one embodiment of the present invention.

First, before explaining an objective lens actuator of the present invention, a principle underlying the present invention will be explained.

In FIG. 2, when an active action force f (an impact force or a sinusoidal wave excitation force) is applied to a rigid body 41, the rigid body 41 makes a rotating motion about a point O when satisfying the following equation (1), which is described, for example, in "*Mechanics*" (written by Kenichi Goto) published in 1975 by Gakujutsu Tosho Co., Ltd., on page 107:

$$a = I/Mh, \quad (1)$$

where M is a mass of the rigid body 41, I is a moment of inertia of the rigid body 41 about a center of gravity G, a is a distance between the center of gravity G and a line of action (a line in a direction of an action force passing through a point of action F), and h is a distance between the point O and the center of gravity G. The following description will further explain how to obtain the equation (1).

Motion equations of the rigid body 41 can be expressed by the following equations (2) and (3):

$$m \frac{d^2 x}{dt^2} = f \quad (2)$$

$$I \frac{d^2 \theta}{dt^2} = fa \quad (3)$$

where x is a displacement amount of the point of gravity G in a direction of the line of action, θ is an angle about the point of gravity G, and m is a mass of the rigid body 41.

When an action force f is a sinusoidal wave excitation force, if it is set as $f = f_0 \sin\omega t$, the foregoing equations (2) and (3) can be expressed as follows:

$$\frac{dx}{dt} = -\frac{f_0 \cos\omega t}{m\omega} \quad (4)$$

$$\frac{d\theta}{dt} = -\frac{a f_0 \cos\omega t}{I\omega} \quad (5)$$

When a speed at the point O is set as $V_0$, $V_0$ can be expressed by the following equation (6).

$$V_0 = \frac{dx}{dt} - h \cdot \frac{d\theta}{dt} = -\frac{f_0 \cos\omega t}{m\omega} + \frac{h a f_0 \cos\omega t}{I\omega} \quad (6)$$
$$= \frac{f_0 \cos\omega t}{\omega}\left(-\frac{1}{m} + \frac{ha}{I}\right)$$

Here, in the equation (6), if a=I/mh, it turns out that $V_0=0$, meaning that the point O does not move. Thus, if a=I/mh when the active action force f (a sinusoidal wave excitation force) is applied to the rigid body 41, the rigid body 41 rotates about the point O. That is, in this case, regardless of whether the rigid body 41 is supported by, for example, a spring, or not, if a point satisfying the equation (6) (a point of action) is actively excited, the rigid body 41 is likely to rotate about the point O.

In this manner, if a=I/mh, the point O is not displaced despite the application of the active action force f to the rigid body 41, and even if the point O is supported, a drag is not generated at the support section. Hereinafter, the point O in this case will also be referred to as "an instantaneous center of rotation", and the point of action F in this case will also be referred to as "a center of impact".

Next, the following description will explain motions of the rigid body 41 and deformations of a leaf spring when the rigid body 41 to which the action force f is applied is supported by the leaf spring. FIGS. 3(a) through 3(e) show that, when the rigid body 41 is supported by a leaf spring 42 having a certain length, the rigid body 41 moves differently according to the position of the point of action F.

Figure 3:
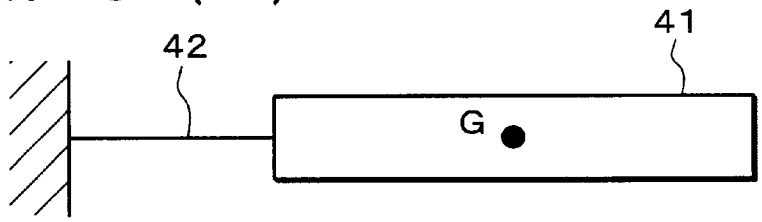
FIG. 3(a) is an explanatory view showing a state in which a rigid body is supported by a leaf spring.
FIGS. 3(b) through 3(e) are explanatory views explaining that the leaf spring is deformed differently according to the position of a point of action.
Figure 3:
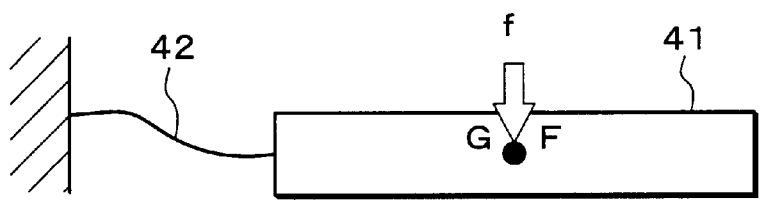
Figure 3:
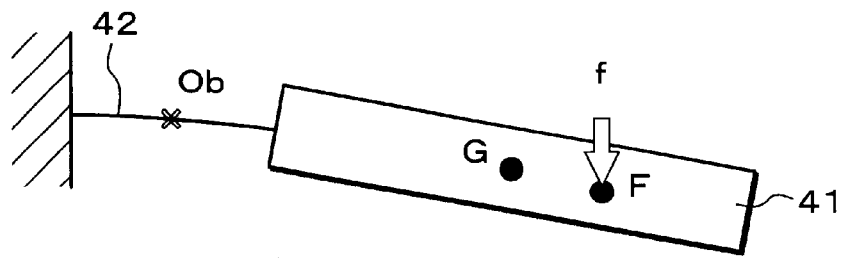
Figure 3:
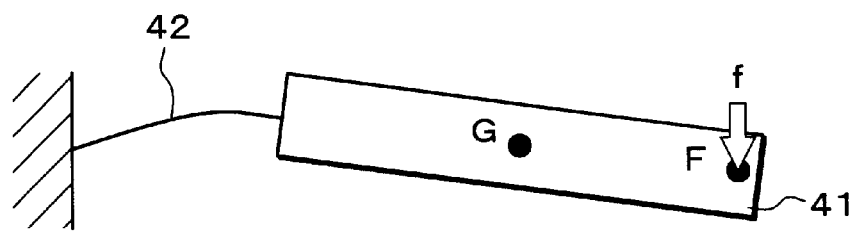
Figure 3:
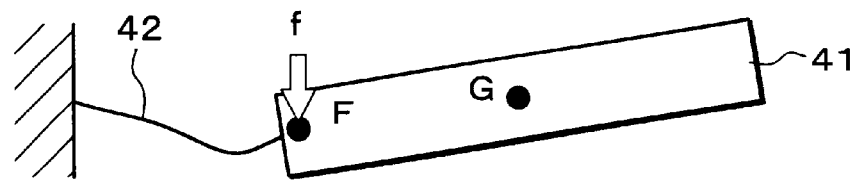

First, in a state where the rigid body 41 is supported by the leaf spring 42 as shown in FIG. 3(a), when the active action force f is applied to the rigid body 41 in such a manner that the point of action F coincides with the point of gravity G of the rigid body 41 as shown in FIG. 3(b), the rigid body 41 tries to move parallel to the direction the active action force f is applied, and the leaf spring 42 deforms as shown in FIG. 3(b).

In the case where the point of action F is located at the center of impact so that a center Ob of the leaf spring 42 becomes an instantaneous center of rotation as shown in FIG. 3(c), when the active action force f is applied to the point of action F, the rigid body 41 tries to rotate about the center Ob of the leaf spring 42 as mentioned above, and the leaf spring 42 deforms as shown in FIG. 3(c), in the same way as in the case where a static force is applied, which will be described later.

In the case where the point of action F is located in the rigid body 41 at a position farthest from the point of gravity G on a side opposite to the side connected with the leaf spring 42 as shown in FIG. 3(d), when the active action force f is applied to the point of action F, the rigid body 41 tries to rotate about a position in the leaf spring 42 which is close to the point of gravity G of the rigid body 41, and the leaf spring 42 deforms as shown in FIG. 3(d).

In the case where the point of action F is located in the rigid body 41 at a position farthest from the point of gravity G on a side close to the leaf spring 42 as shown in FIG. 3(e), when the active action force f is applied to the point of action F, the rigid body 41 tries to rotate about a position in the leaf spring 42 which is close to the point of gravity G of the rigid body 41, in a direction opposite to that shown in FIG. 3(d), and the leaf spring 42 deforms as shown in FIG. 3(e).

On the other hand, for example, when not an active force as mentioned above but a static force is applied to the respective positions of the point of action F shown in FIGS. 3(b), 3(c), and 3(d), if the leaf spring 42 is short in length, it can be considered that bending moments generated in the leaf spring 42 are almost identical in the respective positions. In this case, the leaf spring 42 deforms like an arch, at a static spring constant. Incidentally, a bending moment M at this time can be expressed by the following equation:

$$M = EI/\rho,$$

where ρ is a radius of curvature, M is the bending moment, E is a Young's modulus of the leaf spring 42, and I is a geometrical moment of inertia.

Therefore, considering boundary conditions of a fixed section that the leaf spring 42 is perpendicular to a surface to which one end of the leaf spring 42 (the end opposite to the end connected with the rigid body 41) is fixed, it is supposed that the rigid body 41 rotates about the center Ob of the leaf spring 42 which deforms like an arch, regardless of whether the value of the bending moment M is great or small.

Consequently, it is clear that, when an active force is applied to the rigid body 41, the leaf spring 42 deforms in the same way as in the case where the above-mentioned static force is applied, only when the active force is applied to the point of action F shown in FIG. 3(c). In this case, it can be said that the leaf spring 42 deforms at a static spring constant, even when the active force is applied to the rigid body 41.

That is, when the point of action F is located at the center of impact, the leaf spring 42 deforms in the same way as the deformation at a static spring constant even when an active force is applied to the rigid body 41, and when the point of action F is located at a position except the center of impact, the leaf spring 42 deforms at a constant different from the static spring constant when an active force is applied to the rigid body 41.

Generally, primary resonance denotes a state where a spring vibrates at a static spring constant, and secondary or higher-degree resonance denotes a state where a spring vibrates at a constant other than the static spring constant. Thus, when the action force f is an active sinusoidal wave excitation force, in FIG. 3(c), the leaf spring 42 is hard to be vibrated in a resonance mode having a resonance frequency except the primary resonance frequency, and in FIGS. 3(b), 3(d), and 3(e), it is easy to be vibrated in a resonance mode having the secondary or higher-degree resonance frequency.

Figure 4:
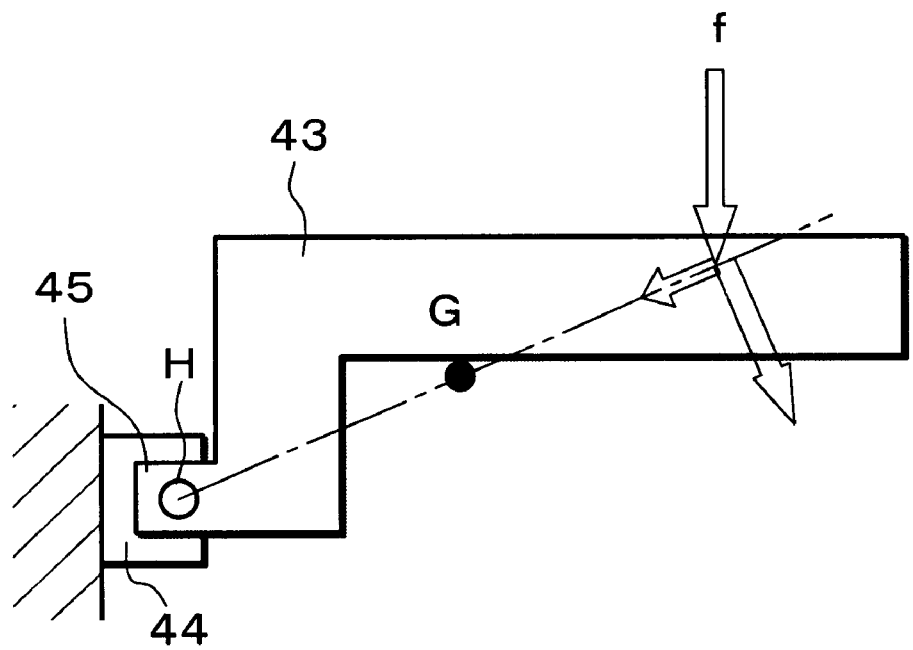
FIG. 4(a) is an explanatory view showing a rigid body provided with a hinge section in such a manner that a line of action is not perpendicular to a line G-H.
FIG. 4(b) is an explanatory view showing a rigid body provided with a hinge section in such a manner that the line of action is perpendicular to the line G-H.
Figure 4:
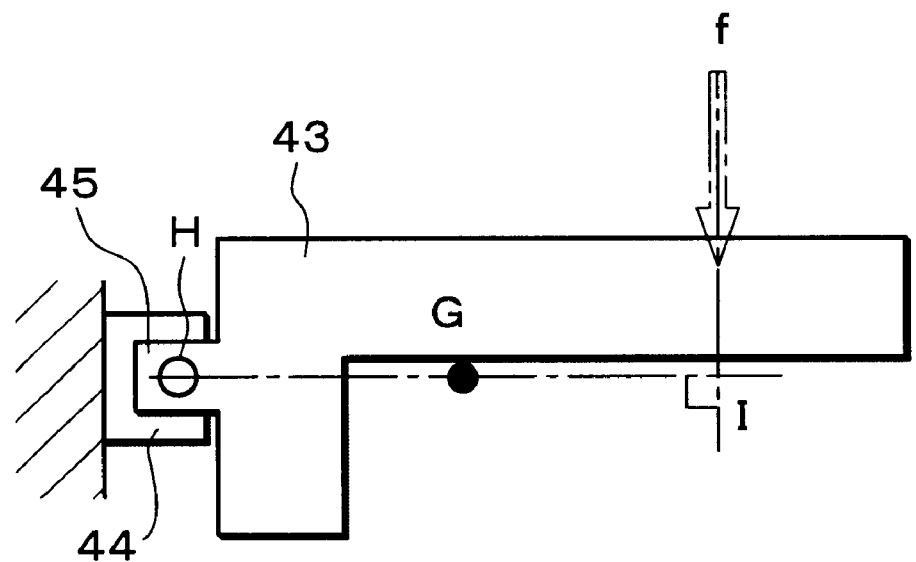

As shown in FIG. 4(a), when a rigid body is constituted as an L-shaped rigid body 43, and the rigid body 43 is structured so as to have a hinge section 45 supported by a fixing section 44 so as to be rotatable, there are some cases where the action force f acts on the rigid body 43 at an angle not perpendicular to a line passing through a center of gravity G of the rigid body 43 and a point H which should act as a center of rotation in the hinge section 45. In this case, a force in a direction of the line G-H, which is a component of the action force f, acts on the rigid body 43, and the fixing section 44 is excited by the force. However, such an excitation of the fixing section 44 can be prevented by locating the hinge section 45 at a position which is on an extension line of a perpendicular G-I between the center of gravity G of the rigid body 43 and a point I, a foot of the perpendicular drawn from the center of gravity G to the line of action, as shown in FIG. 4(b), and which satisfies the foregoing equation (1).

Based on the above-mentioned principle, an objective lens actuator of the present invention absorbs a reaction force with its rotation structure, downsizing a leaf spring and the objective lens actuator itself. The following description will describe the objective lens actuator of the present invention.

Incidentally, the objective lens actuator of the present invention (hereinafter simply referred to as the actuator) is adopted to the magneto-optical disk device 51 shown in FIGS. 9(a) through 9(c), the components of which are identical to those of the conventional magneto-optical disk device except the actuator 60. Therefore, hereinafter, explanation will be given mainly on the actuator of the present invention.

As shown in FIGS. 1(a) and 1(b), the actuator 1 of the present invention includes an objective lens 2 for focusing a light beam emitted from a light source (not shown) onto an magneto-optical disk (an optical disk: not shown), and an objective lens holder 3 (objective lens holding element) for holding the objective lens 2. The objective lens holder 3 is fixed to an actuator base 5 via four support wires 4 (for example, piano wires) which are located in parallel to one another.

The actuator base 5 includes a horizontal section 5a; a rising section 5b formed by raising one end of the horizontal section 5a in a lengthwise direction, vertically with respect to the horizontal section 5a; and a rising section 5c formed by raising the other end of the horizontal section 5a in a lengthwise direction, vertically with respect to the horizontal section 5a. That is, the actuator base 5 is formed in a three-sided shape. The objective lens holder 3 is fixed to the rising section 5b of the actuator base 5 via the four support wires 4, and supported by the four support wires 4, which are strung parallel to the horizontal section 5a, in a cantilever manner above the horizontal section 5a.

On a side of the objective lens holder 3 close to the rising section 5c, a focus coil 6 and a tracking coil 7 are fixed. The focus coil 6 and the tracking coil 7 constitute a driving section for driving the objective lens holder 3 in a focus direction and in a tracking direction, together with a magnetic circuit 8.

The magnetic circuit 8 is fixed to the rising section 5c of the actuator base 5 via a single leaf spring 9 (a support member). That is, the magnetic circuit 8 is supported by the leaf spring 9, which is provided parallel to the horizontal section 5a, in a cantilever manner above the horizontal section 5a. Therefore, in the present embodiment, the magnetic circuit 8 constitutes a supported element supported by the leaf spring 9.

The magnetic circuit 8 is made up of a pair of permanent magnets 8a, and a yoke 8b formed in a three-sided shape for holding the permanent magnets 8a so that they face each other. The permanent magnets 8a and the yoke 8b are provided in such a manner that one of the permanent magnets 8a is inserted into the focus coil 6, and the tracking coil 7 is located between the pair of permanent magnets 8a. A magnetic flux generated in a cavity in the magnetic circuit 8 and a current flowing the focus coil 6 and the tracking coil 7 react one another and generate electromagnetic forces, and a resultant force of the electromagnetic forces acts on the objective lens holder 3, displacing the objective lens holder 3 in the focus direction and the tracking direction of the magneto-optical disk.

Consequently, the focus coil 6, the tracking coil 7, and the magnetic circuit 8 constitute an action force generation source for generating an action force to displace the objective lens holder 3 in the focus direction and the tracking direction of the magneto-optical disk.

The magnetic circuit 8 also includes an additional yoke plate 8c provided so as to cover an opening section of the yoke 8b. By providing the additional yoke plate 8c, it becomes possible to adjust the position of a center of gravity G of the magnetic circuit 8.

In the present embodiment, it is structured that the leaf spring 9 supports the magnetic circuit 8 at a position having a height identical to that of the center of gravity G of the magnetic circuit 8, so that a point of action F, where a reaction force of the force acting on the objective lens holder 3 generated in response to the electromagnetic force generated by the focus coil 6 and the magnetic circuit 8 acts on the magnetic circuit 8, becomes the foregoing center of impact in the magnetic circuit 8. Further, a weight of the additional yoke plate 8c of the magnetic circuit 8 is determined so that a line O-G passing through the center of gravity G of the magnetic circuit 8 and a center of rotation O of the leaf spring 9 is virtually orthogonal to a line of action in the direction of the action force.

Here, the foregoing equation a=I/Mh is satisfied, where M is a mass of the magnetic circuit 8, I is a moment of inertia of the magnetic circuit 8 about the center of gravity G, a is a distance between the center of gravity G of the magnetic circuit 8 and the line of action in the direction of the action force (in the direction of the reaction force), and h is a distance between the center of rotation O of the leaf spring 9 and the center of gravity G of the magnetic circuit 8. In addition, the thickness of the yoke 8b of the magnetic circuit 8 is formed such that the side close to the leaf spring 9 is thicker than the side close to the objective lens holder 3, facilitating to satisfy the foregoing equation.

In this structure, according to the foregoing principle, even when an active action force, that is, the electromagnetic force (a sinusoidal wave excitation force) generated based on the current flowing the focus coil 6 and the magnetic flux generated in the magnetic circuit 8, is generated while the objective lens is driven by the action force generation source, the leaf spring 9 is flexed at a static spring constant by a reaction force of the action force, and the magnetic circuit 8 comes to rotate statically about an arbitrary point O of the leaf spring 9. In other words, when the action force generation source generates the active action force, the leaf spring 9 rotates the magnetic circuit 8 about the arbitrary point O of the leaf spring 9, by the reaction force of the action force.

With this structure, the reaction force is absorbed by the rotation of the magnetic circuit 8, which eliminates the vibration of the actuator base 5 caused by the reaction force, and the transmission of the vibration via the actuator base 5 to the magneto-optical disk. Therefore, according to the rotation structure of the present invention, it becomes possible to eliminate the vibration of the magneto-optical disk caused by the reaction force, and to perform stable focus servo.

When the leaf spring 9 is shorter than an entire rotation length L' [see FIG. 1(b)] as in the present embodiment, the leaf spring 9 serves as an elastic hinge, rotating the magnetic circuit 8 about the point O of the leaf spring 9.

Since the line O-G is virtually orthogonal to the line of action, no component of the reaction force is generated in a direction of the point of the gravity G. Therefore, the magnetic circuit 8 and the leaf spring 9 are not excited by the component of the reaction force, surely obtaining the effect of vibration absorption by the rotation of the magnetic circuit 8.

In the conventional structure having parallel leaf springs, the rigid body (a magnetic circuit) is supported and the leaf springs are fixed to the actuator base at two points, respectively, having less space which can be used effectively inside the actuator. On the other hand, in the present invention, a rigid body (the magnetic circuit 8) is supported and the leaf spring 9 is fixed to the actuator base at one point, respectively, obtaining an effect that space can be used effectively inside the actuator.

Incidentally, even if the yoke 8b is inclined by the rotation of the magnetic circuit 8, the objective lens holder 3 is not inclined as it is supported by the actuator base 5 via the four support wires 4, and the inclination of a light axis of the objective lens can be restrained.

Next, detailed explanation will be given on the effect of downsizing the actuator 1 obtained by the rotation structure of the present invention, comparing it with an elastically supporting structure using conventional parallel leaf springs.

Figure 5:
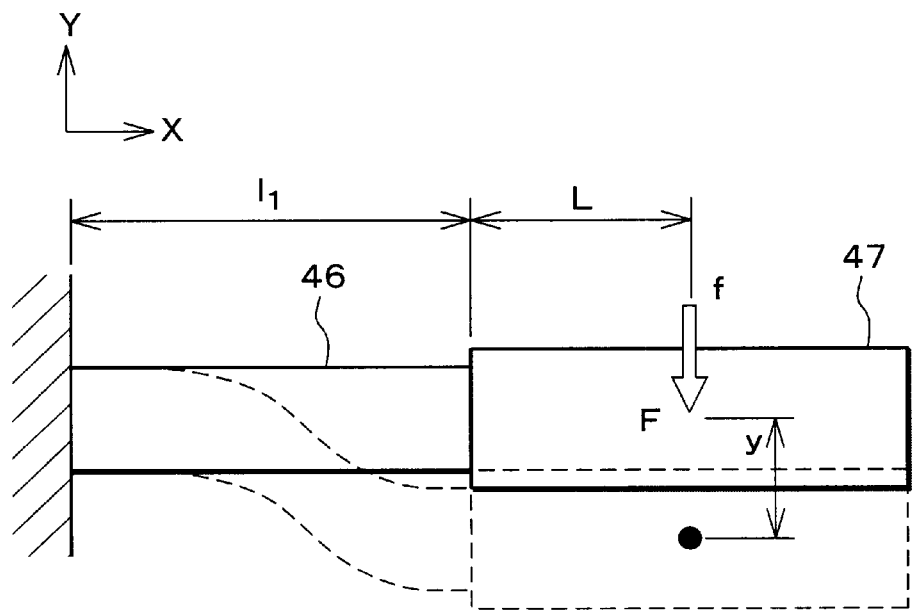
FIG. 5(a) is an explanatory view showing a state of the deformation of a leaf spring and the displacement of a rigid body in a conventional structure having parallel leaf springs.
FIG. 5(b) is an explanatory view showing a state of the deformation of a leaf spring and the displacement of a rigid body in a rotation structure of the present invention.
Figure 5:
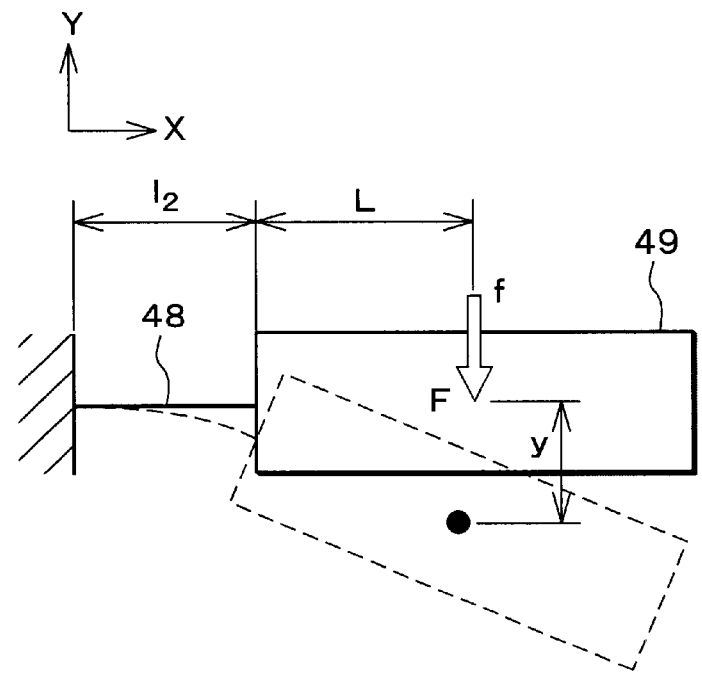

First, a spring constant $K_1$ of leaf springs 46 in the conventional structure having parallel leaf springs shown in FIG. 5(a), and a spring constant $K_2$ of a leaf spring 48 in the rotation structure of the present invention shown in FIG. 5(b) will be obtained. Then, lengths of the both springs in the case where the spring constants $K_1$ and $K_2$ are considered to be identical will be compared.

Here, in FIGS. 5(a) and 5(b), X direction denotes a horizontal direction from a fixed end of the leaf spring 46 or 48, and Y direction denotes a direction of a line of action. Besides, $l_1$ denotes a length of the leaf spring 46 in the X direction, L denotes a distance between the line of action and a section where the leaf spring 46 and a rigid body 47 are connected, $l_2$ denotes a length of the leaf spring 48 in the X direction, and L also denotes a distance between the line of action and a section where the leaf spring 48 and a rigid body 49 are connected. Further, E denotes a Young's modulus of the leaf springs 46 and 48, and I denotes a geometrical moment of inertia of the leaf springs 46 and 48 ($I_1$ and $I_2$, respectively, when expressed separately).

(The calculation of the spring constant $k_1$)

Generally, based on mechanics of material, a curve $y_1$ showing flexure of tension can be obtained by solving a differential equation expressed by the following equation (7):

$$EI\frac{d^4 y_1}{dx^4} - w = 0 \tag{7}$$

where w is a load per unit length, but only concentrated load is provided at present, so w=0. Therefore, the equation (7) can be expressed by the following equation (8):

$$EI\frac{d^4 y_1}{dx^4} = 0 \tag{8}$$

Thus, the flexure curve $y_1$ can be expressed by the following equation (9):

$$y_1 = C_1 x^3 + C_2 x^2 + C_3 x + C_4, \tag{9}$$

where $C_1$ through $C_4$ are integration constants.

Here, in FIG. 5(a), if the two leaf springs 46 deform as shown by the dotted lines when an action force f is applied to the rigid body 47, boundary conditions at this time are as follows.

$$y_1 = 0 \text{ (when } x=0\text{)} \tag{10}$$

$$dy_1/dx = 0 \text{ (when } x=0\text{)} \tag{11}$$

$$dy_1/dx = 0 \text{ (when } x=l_1\text{)} \tag{12}$$

Here, according to the boundary condition defined by the equation (12), a moment fL obtained when $x=l_1+L$ is cancelled by a moment by a force in the X direction caused by the upper and the lower leaf springs 46. Thus, a bending moment M(=E×I×curvature of the leaf spring) at a fixed section (x=0) has the same result as that when the action force f is applied to a position where $x=l_1$. Therefore, an equation of balance at the fixed section (x=0) becomes as follows:

$$M = EI_1 \frac{d^2 y_1}{dx^2} = -fl_1 \tag{13}$$

When integration constants $C_1$ through $C_4$ are obtained from the above equations (9) through (13), the flexure curve $y_1$ is defined by the following equation (14):

$$y_1 = \frac{f}{3EI_1} x^3 - \frac{fl_1}{2EI_1} x^2 \tag{14}$$

Therefore, a displacement y at a loaded point ($x=l_1$) can be expressed by the following equation (15):

$$y = \frac{f}{3EI_1}l_1^3 - \frac{fl_1}{2EI_1}l_1^2 = -\frac{fl_1^3}{6EI} \quad (15)$$

In FIG. 5(a), two leaf springs 46 are used, so an identical amount of force is applied, the amount of displacement is halved. Therefore, the amount of displacement can be defined by the following equation (16), omitting a positive and a negative signs:

$$y = \frac{fl_1^3}{12EI_1} \quad (16)$$

From the foregoing equation (16), the spring constant $k_1$ can be expressed by the following equation:

$$k_1 = \frac{f}{y} = \frac{12EI_1}{l_1^3} \quad (17)$$

(Calculation of the spring constant $k_2$)

In FIG. 5(b), boundary conditions and balance conditions of the leaf spring 48 at the fixed end (x=0) can be expressed by the following equations:

$$y_1 = 0 \text{ (when } x=0) \quad (18)$$

$$dy_1/dx = 0 \text{ (when } x=0) \quad (19)$$

$$M = EI_2 \frac{d^2 y_1}{dx^2} = -f(l_2 + L) \text{ (when } x = 0) \quad (20)$$

$$M = EI_2 \frac{d^2 y_1}{dx^2} = -fL \text{ (when } x = l_2) \quad (21)$$

When the integration constants $C_1$ through $C_4$ in the basic equation of the flexure curve $y_1$ shown by the equation (9) are obtained from the above equations (18) through (21), the flexure curve $y_1$ can be expressed by the following equation (22):

$$y_1 = \frac{f}{6EI_2}x^3 - \frac{f}{2EI_2}(l_2 + L)x^2 \text{ (when } x \leq l_2) \quad (22)$$

the displacement y when $x=L_2+L$ is expressed by the following equation (23):

$$y|_{x=l_2+L} = y|_{x=l_2} + \frac{dy}{dx}\bigg|_{x=l_2} \cdot L \quad (23)$$

Meanwhile, the flexure curve when $x=l_2$ can be expressed by the following equation (24), obtained from the equation (22):

$$y|_{x=l_2} = \frac{f}{6EI_2}l_2^3 - \frac{f}{2EI_2}(l_2 + L)l_2^2 \quad (24)$$

When the equation (22) is differentiated to obtain an inclination when $x=l_2$, the following equation (25) can be obtained:

$$\frac{dy}{dx}\bigg|_{x=l_2} = \frac{f}{2EI_2}l_2^2 - \frac{f}{EI_2}(l_2 + L)l_2 \quad (25)$$

When the equations (24) and (25) are substituted into the equation (23), eventually, the displacement when $x=l_2+L$ can be expressed by the following equation (26):

$$y|_{x=l_2+L} = \frac{f}{6EI_2}l_2^3 - \frac{f}{2EI_2}(l_2 + L)l_2^2 + \quad (26)$$

$$\left\{\frac{f}{2EI_2}l_2^2 - \frac{f}{EI_2}(l_2 + L)l_2\right\} \cdot L$$

$$= -\frac{f}{3EI_2}l_2^3 - \frac{f}{EI_2}l_2^2 L - \frac{f}{EI_2}l_2 L^2$$

If the sign is neglected regarding the value as the amount of displacement, the equation (26) can be deformed as follows:

$$y = \frac{fl_2}{EI_2}\left(\frac{1}{3}l_2^2 + Ll_2 + L^2\right) \quad (27)$$

Therefore, from the above equation (27), the spring constant $k_2$ can be expressed by the following equation (28):

$$k_2 = \frac{f}{y} = \frac{EI_2}{l_2\left(\frac{1}{3}l_2^2 + Ll_2 + L^2\right)} \quad (28)$$

(Comparison between $l_1$ and $l_2$)

Here, the relationship among the distance L, the length $l_1$ of the leaf spring 46 in the X direction, and the length $l_2$ of the leaf spring 48 in the X direction will be obtained, when it is regarded that the geometrical moments of inertia $I_1$ and $I_2$ of the leaf springs 46 and 48, respectively, are identical, and that the spring constant $k_1$ and $k_2$ of these leaf springs are identical.

First, from the equations (17) and (28) and the relationship that $k_1=k_2$, the following equation (29) can be obtained:

$$\frac{12EI}{l_1^3} = \frac{EI}{l_2\left(\frac{1}{3}l_2^2 + Ll_2 + L^2\right)} \quad (29)$$

The equation (29) can be arranged as follows:

$$l_1 = \sqrt[3]{4l_2^3 + 12Ll_2^2 + 12L^2 l_2} \quad (30)$$

The following table shows the relationship between L and $l_1$ when $l_2$=1 mm in the equation (30).

| L (mm) | $l_1$ (mm) | $l_2$ (mm) |
|---|---|---|
| 1 | 3.0 | 1 |
| 2 | 4.2 | 1 |
| 3 | 5.2 | 1 |
| 4 | 6.2 | 1 |
| 5 | 7.1 | 1 |

This table shows that, when the leaf spring 48 obtains the same spring constant as that of the leaf springs 46 constituting the structure having parallel leaf springs, the length 12 of the leaf spring 48 can be substantially shorter than the length $l_1$ of the leaf spring 46.

Consequently, it is clear that, in the structure of the present invention in which the magnetic circuit 8 is rotated by the single leaf spring 9, even when the spring constant and the geometrical moment of inertia of the leaf spring 9 are the same as those of the leaf spring used in the conventional structure having parallel leaf springs, the length of the leaf spring 9 can be shortened compared with the leaf spring used in the conventional parallel leaf springs structure. Thus, according to the present invention, the foregoing reaction force can be absorbed and the vibration of the magneto-optical disk can be prevented, and at the same time, the leaf spring 9 can be substantially shortened compared with the leaf spring used in the conventional parallel leaf springs structure. Therefore, the rotation structure of the present invention can surely provide a downsized actuator compared with the conventional parallel leaf springs structure.

Besides, there is no need to worry about plastic deformation of the leaf spring 9 even though it is not made of a material having a low Young's modulus, as the length of the leaf spring 9 can be shortened in the rotation structure of the present invention. Thus, there is no need to additionally provide a structure for preventing the plastic deformation (for example, a stopper for preventing the plastic deformation of the leaf spring 9 that is more than required). Consequently, according to the present invention, the leaf spring 9 can be shortened with a simple structure, achieving the downsizing of the actuator 1.

Figure 6:
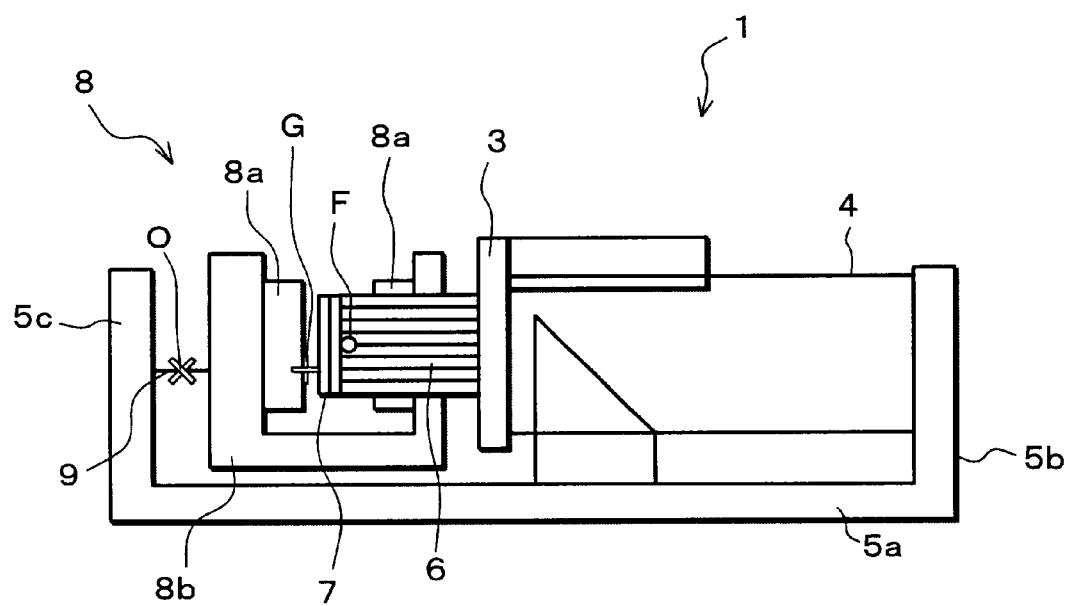
FIG. 6 is a side view showing another example of a structure of the objective lens actuator.

Meanwhile, in the present embodiment, the position of the center of gravity of the magnetic circuit 8 is adjusted by providing the additional yoke plate 8*c*, and the line O-G and the line of action intersect virtually at right angles, but the line O-G and the line of action can also intersect virtually at right angles without the additional yoke plate 8*c*. That is, as shown in FIG. 6, the magnetic circuit 8 is formed without the additional yoke plate 8*c* so that the upper side of the magnetic circuit 8 is lighter in weight, and the position of the leaf spring 9 is lowered more than in the case shown in FIG. 1, and thus the line O-G and the line of action can intersect virtually at right angles. In this case, the structure of the magnetic circuit 8 can be simplified while restraining the transmission of the reaction force.

SECOND EMBODIMENT

Referring to the drawings, the following description will describe another embodiment of the present invention. The members having the same structure (function) as those in the first embodiment will be designated by the same reference numerals and their description will be omitted.

Figure 7:
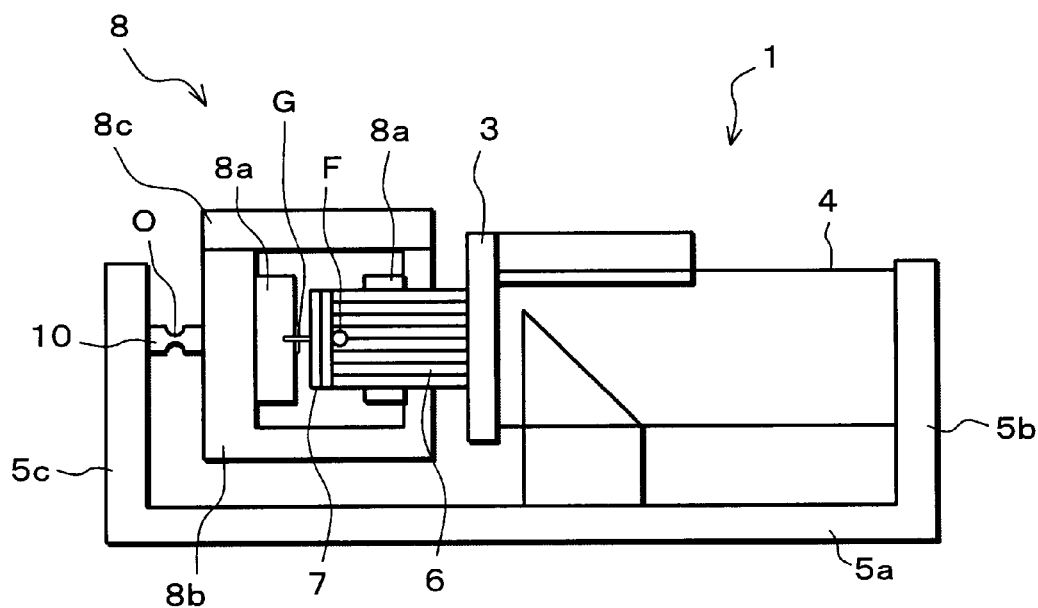
FIG. 7(a) is a side view showing one example of a structure of an objective lens actuator in accordance with another embodiment of the present invention.
FIG. 7(b) is a side view showing another example of a structure of the objective lens actuator.
Figure 7:
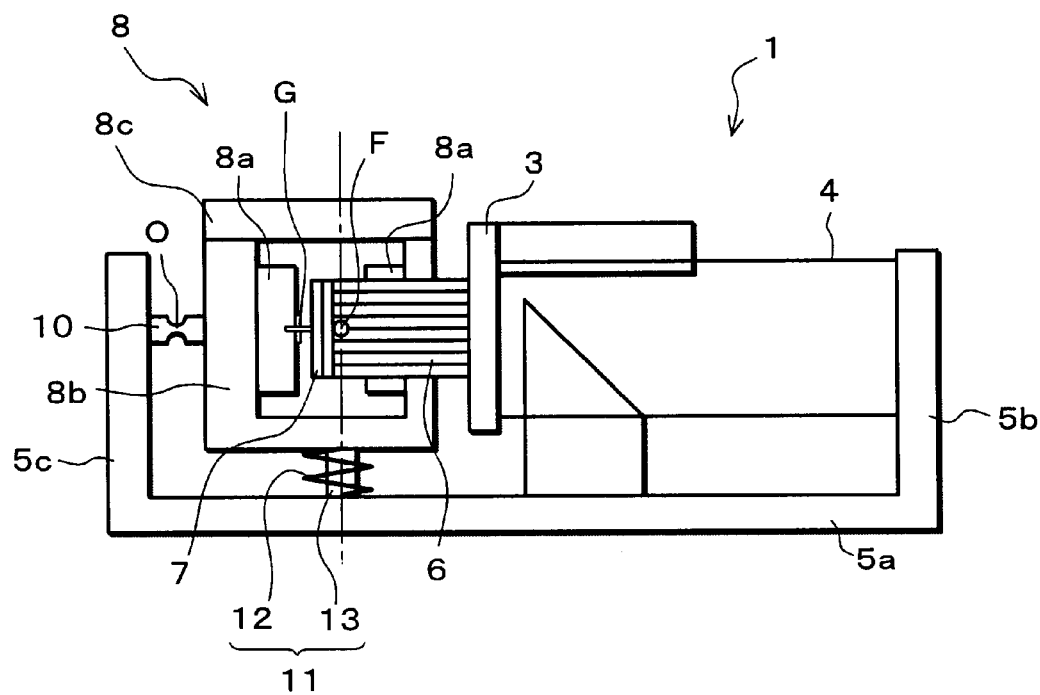
Figure 11:
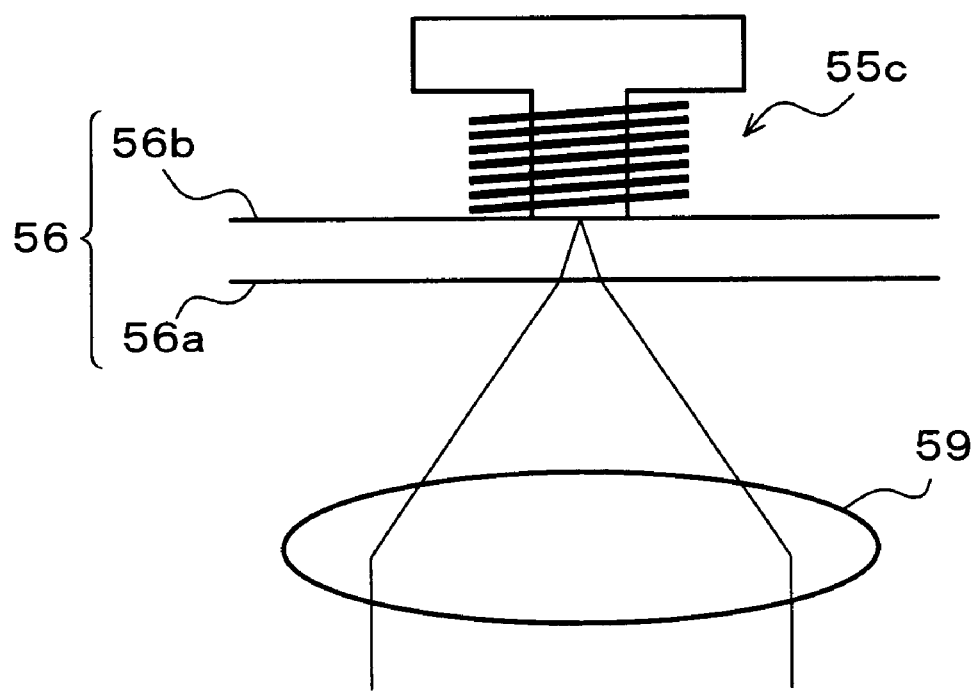
FIG. 11 is an explanatory view showing a state where a light beam is focused onto a magneto-optical disk by an objective lens of the objective lens actuator.
Figure 12:
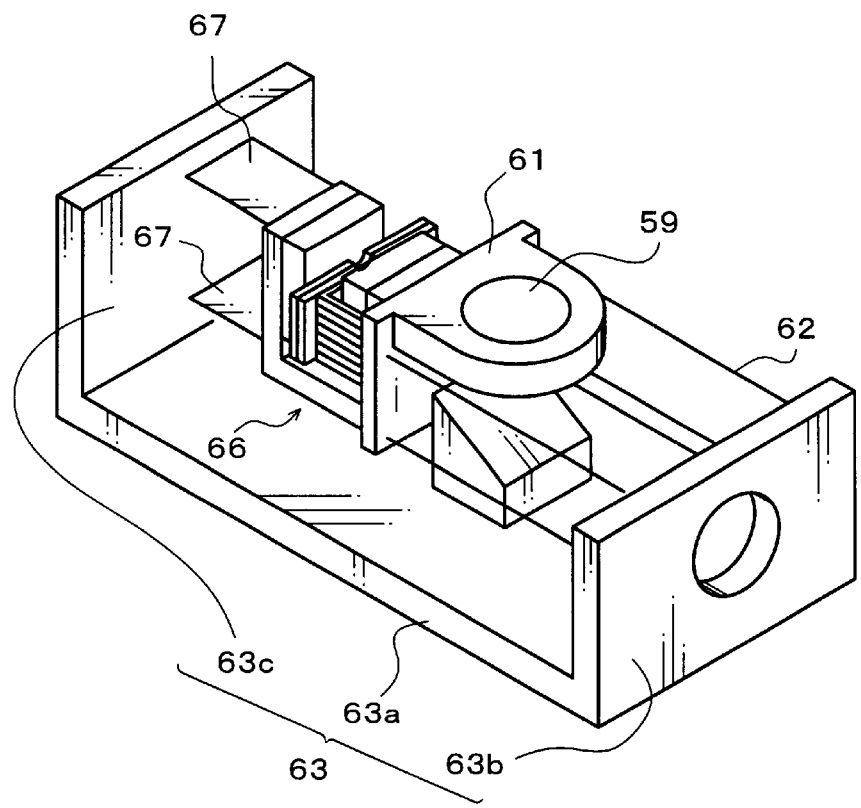
FIG. 12(a) is a perspective view showing a schematic structure of another conventional objective lens actuator.
FIG. 12(b) is a side view of the objective lens actuator.
Figure 12:
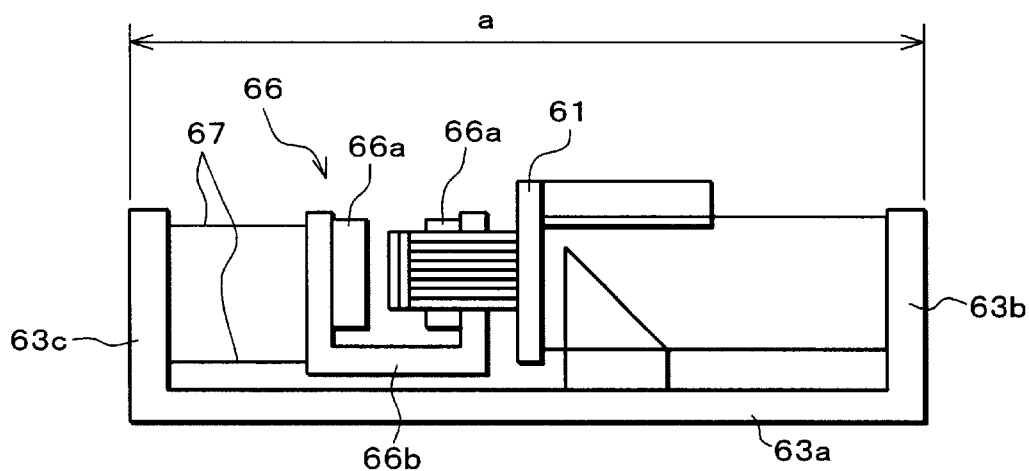

As shown in FIG. 7(*a*), the structure of the present embodiment is identical to that shown in FIGS. 1(*a*) and 1(*b*), except that the leaf spring 9 [see FIG. 1(*b*)] is replaced with an elastic hinge 10 (a support member).

The elastic hinge 10 is structured so as to have a narrow portion having less thickness than that of other portion, at a part of a leaf spring. The position of the narrow portion provided in the elastic hinge 10 corresponds to the center of rotation O explained in the first embodiment (hereinafter, the position will be referred to as the point O in the present embodiment).

Also in this structure, when an active action force is generated when the objective lens is driven by the action force generation source, the elastic hinge 10 is flexed by a reaction force of the action force, and the magnetic circuit 8 comes to rotate about the point O of the elastic hinge 10.

Therefore, since the magnetic circuit 8 rotates as in the case of the first embodiment using the leaf spring 9, just like the first embodiment, the structure of the second embodiment can have an effect that the reaction force is absorbed by the rotation of the magnetic circuit 8, which eliminates the vibration of the magneto-optical disk and provides stable focus servo. At the same time, it can also have an effect that the actuator 1 can be downsized with its rotation structure.

Since a part of the elastic hinge 10 becomes narrow having less thickness, the position of the point O, which is an instantaneous center of rotation, hardly deviates from the narrow portion. Thus, the magnetic circuit 8 can be stably rotated about the narrow portion, regardless of the strength of the reaction force. With this structure, the effect of preventing the vibration of the magneto-optical disk can be surely enhanced, and focus servo can be performed more stably.

Meanwhile, when spring strength of the elastic hinge 10 is reduced by having a narrow portion, the following arrangement may be adopted. That is, as shown in FIG. 7(*b*), the arrangement having a viscoelastic structure 11 provided between the magnetic circuit 8 and the actuator base 5 so as to elastically support the magnetic circuit 8 may be adopted.

The viscoelastic structure 11 is made up of a spring 12 and a viscoelastic element 13, and provided so as to be located on the line of action passing through the point of action F. The viscoelastic element 13 is made of, for example, gum or grease, and has a function to decrease amplitude increased by resonance. Incidentally, if the viscoelastic element 13 is made of a material having strong elastic property such as gum, the spring 12 may not be used.

By providing the viscoelastic structure 11 in such a manner, even when the spring strength of the elastic hinge 10 is weak and resonance occurs in the magnetic circuit 8, the viscoelastic structure 11 can decrease the amplitude increased by the resonance. Thus, even when the spring strength of the elastic hinge 10 is weak, the structure can surely prevent the vibration of the actuator base 5 via the elastic hinge 10, and surely obtain the effect of preventing the vibration of the magneto-optical disk.

In addition, since the viscoelastic structure 11 is provided on the line of action in the direction of the action force, the effect of vibration absorption by the viscoelastic structure 11 can be enhanced.

When using the viscoelastic structure 11, as long as a support member supporting the magnetic circuit 8 can rotate the magnetic circuit 8 about the point O, the support member can also be made of a material not generating spring strength, by adjusting the elastic property of the viscoelastic structure 11. That is, as shown in FIG. 8, a normal hinge 14 (a support member) without having spring strength may be used instead of the elastic hinge 10.

The hinge 14 is structured so as to include an arm 14*a* (a first arm) having one end fixed to the actuator base 5, and an arm 14*b* (a second arm) having one end fixed to the magnetic circuit 8, wherein the other end of the arm 14*a* and the other end of the arm 14*b* are connected via an axis section 14*c*, and the arm 14*b* rotates about the axis section 14*c*, making it an axis of rotation. If the hinge 14 is structured such that the axis section 14*c* corresponds to the point O (the instantaneous center of rotation) described in the first embodiment, even when the normal hinge 14 is used, the effect of preventing the vibration of the magneto-optical disk can be surely obtained by using the hinge 14 and the viscoelastic structure 11 so as to constitute the actuator 1.

In the first and the second embodiments, explanation has been given on an example where the focus coil 6 and the tracking coil 7 are integrally provided to the objective lens holder 3 to constitute a moving action force generation source, and the magnetic circuit 8 is fixed to the actuator base 5 via a support member such as the leaf spring 9, etc. to constitute a fixed action force generation source, and the moving action force generation source and the fixed action force generation source constitute the action force generation source. However, it is needless to say that the moving action force generation source and the fixed action force generation source may be reversely structured.

That is, even if the focus coil 6 and the tracking coil 7 are integrally fixed to the actuator base 5 via the leaf spring 9 to constitute a fixed action force generation source, and the magnetic circuit 8 is integrally provided to the objective lens holder 3 to constitute a moving action force generation source, the effect of the present invention as described above can be obtained in the same way. Therefore, the actuator of the present invention may be satisfactorily structured as long as it has a support member for supporting either the focus coil 6 and the tracking coil 7 or the magnetic circuit 8 as a supported element(s) [a rotation element(s)] with respect to the actuator base 5.

In the foregoing objective lens actuator in accordance with the present invention, it is preferable that a straight line passing through the center of gravity of the supported element and the center of rotation of the support member is virtually orthogonal to the line of action in the direction of the action force. With this structure, since the straight line passing through the center of gravity of the supported element and the center of rotation of the support member is virtually orthogonal to the line of action, a component of the reaction force in the direction of the center of gravity is not generated. Therefore, the structure eliminates the possibility that the supported element and the support member are excited by the component of the reaction force, surely obtaining the effect of vibration absorption.

It is preferable that the objective lens actuator in accordance with the present invention is structured such that the support member is constituted by an elastic hinge in which a narrow portion having less thickness than that of other portion serves as the center of rotation. According to this structure, the support member is constituted by an elastic hinge, and a part of the elastic hinge becomes narrow so as to be a narrow portion, which serves as the center of rotation. In this case, the center of rotation hardly deviates from the narrow portion, and the supported element can be stably rotated about the narrow portion. Accordingly, the effect of preventing the vibration of the magneto-optical disk can be surely enhanced, and focus servo can be performed more stably.

It is preferable that the objective lens actuator in accordance with the present invention is arranged to have a viscoelastic structure for elastically supporting the supported element, on the line of action in the direction of the action force. According to the arrangement, since the viscoelastic structure is provided on the line of action, the excitation of the supported element can be efficiently restrained by vibration attenuating action of the viscoelastic structure. As a result, the effect of preventing the vibration can be further enhanced. Even when the spring strength of the elastic hinge is weak, the viscoelastic structure can assist the elastic hinge. Therefore, the plastic deformation of the elastic hinge can also be prevented.

It is preferable that the objective lens actuator in accordance with the present invention is arranged such that a viscoelastic structure for elastically supporting the supported element is provided on the line of action in the direction of the action force, and a support member includes a first arm having one end fixed to the actuator base and a second arm having one end fixed to the supported element, wherein the other end of the first arm and the other end of the second arm are connected via an axis section corresponding to the center of rotation. According to this structure, the support member is constituted by the first arm and the second arm, and these first and second arms are connected via the axis section corresponding to the center of rotation. Thus, while the second arm, for example, can rotate with respect to the first arm, making the axis section an axis of rotation, spring strength is not generated in the support member itself. That is, a normal hinge can be assumed as the support member in this case.

Here, since the viscoelastic structure is provided on the line of action of the action force (the action force for displacing an objective lens holding element in a focus direction of an optical disk), the position where the resultant force of the action force and a viscoelastic force generated by the viscoelastic structure is applied to the supported element remains the same, maintaining the equation a=I/Mh. With this structure, a force is not applied to the axis section, and vibration is not transmitted at the axis section, surely cutting off the excitation and obtaining the effect of preventing the vibration.

Furthermore, the actuator of the present invention which has been described above in the embodiments can be expressed as a first through a fourth actuator as follows.

The first actuator, which is an objective lens actuator used in an optical disk device structured so as to include:

- an objective lens moving element for holding an objective lens;
- a moving action force generation source including a coil or a magnetic circuit, integrally provided to the objective lens moving element;
- a fixed action force generation source including a magnetic circuit or a coil; and
- an actuator base fixed to an optical pick-up,
- wherein a laser beam is focused onto an information recording medium of an optical disk by displacing the objective lens by electromagnetic force generated when flowing a current into a coil,
- is characterized in that the fixed action force generation source is supported so as to be freely rotated with respect to the actuator base, and a line of action of a resultant force of the electromagnetic force virtually passes through a center of impact determined based on a center of gravity, a mass, a center of rotation, and a moment of inertia of a rotation element including the fixed action force generation source.

When the line of action passes through a position except the center of impact, a secondary or higher-degree resonance is caused, and the effect of vibration absorption cannot be obtained as desired. However, since the line of action passes through the center of impact, a rotation structure can be adopted while maintaining the effect of vibration absorption, and the actuator can be downsized.

The second actuator is structured such that, in the first actuator, a straight line passing through the center of gravity of the rotation element and the center of rotation is virtually orthogonal to the line of action.

The third actuator is structured such that, in the first actuator, the center of rotation of the rotation element including the fixed action force generation source is constituted by an elastic hinge.

The fourth actuator is structured such that, in the first or third actuator, the rotation element is supported by a viscoelastic structure at a position virtually coinciding with the center of impact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An objective lens actuator comprising:

an objective lens holding element for holding an objective lens which focuses a light beam onto an optical disk;

an action force generation source for generating an action force for displacing said objective lens holding element in a focus direction of said optical disk, by using a coil and a magnetic circuit;

a support member for supporting either said coil or said magnetic circuit as a supported element, with respect to an actuator base, wherein, when said action force generation source generates the action force, said support member supports said supported element in such a manner that said supported element can be rotated about an arbitrary point of said support member by a reaction force of the action force; and an equation that a=I/Mh holds, where M is a mass of said supported element, I is a moment of inertia of said supported element about a center of gravity, a is a distance between the center of gravity of said supported element and a line of action in a direction of the action force, and h is a distance between a center of rotation in said support member and the center of gravity of said supported element.

2. The objective lens actuator of claim 1, wherein:

a straight line passing through the center of gravity of said supported element and said center of rotation in said support member is virtually orthogonal to the line of action in the direction of the action force.

3. The objective lens actuator of claim 2, wherein:

said support member is constituted by an elastic hinge in which a narrow portion having less thickness than that of other portion serves as said center of rotation.

4. The objective lens actuator of claim 2, further comprising:

a viscoelastic structure provided on the line of action in the direction of the action force, for elastically supporting said supported element, wherein said support member includes a first arm having one end fixed to said actuator base and a second arm having one end fixed to said supported element, and the other end of the first arm and the other end of the second arm are connected via an axis section corresponding to said center of rotation.

5. The objective lens actuator of claim 2, wherein:

said supported element is said magnetic circuit, and said magnetic circuit is provided with an additional yoke plate so that a straight line passing through a center of gravity of said magnetic circuit said the center of rotation of said support member is virtually orthogonal to the line of action in the direction of the action force.

6. The objective lens actuator of claim 1, wherein:

said support member is constituted by an elastic hinge in which a narrow portion having less thickness than that of other portion serves as said center of rotation.

7. The objective lens actuator of claim 6, further comprising:

a viscoelastic structure provided on the line of action in the direction of the action force, for elastically supporting said supported element.

8. The objective lens actuator of claim 7, wherein:

said viscoelastic structure is made up of a spring and a viscoelastic element.

9. The objective lens actuator of claim 1, further comprising:

a viscoelastic structure provided on the line of action in the direction of the action force, for elastically supporting said supported element, wherein said support member includes a first arm having one end fixed to said actuator base and a second arm having one end fixed to said supported element, and the other end of the first arm and the other end of the second arm are connected via an axis section corresponding to said center of rotation.

10. The objective lens actuator of claim 1, wherein:

said support member is a leaf spring.

* * * * *